(12) United States Patent
Zhou et al.

(10) Patent No.: US 9,470,334 B2
(45) Date of Patent: Oct. 18, 2016

(54) FLOW ADJUSTING DEVICE WITH A BUTTON

(75) Inventors: Huasong Zhou, Xiamen (CN); Xiaozhao Sun, Fujian (CN); Wenxing Chen, Xiamen (CN); Renzhong Li, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 702 days.

(21) Appl. No.: 13/821,220

(22) PCT Filed: Sep. 26, 2011

(86) PCT No.: PCT/CN2011/080152
§ 371 (c)(1),
(2), (4) Date: Mar. 6, 2013

(87) PCT Pub. No.: WO2012/041195
PCT Pub. Date: Apr. 5, 2012

(65) Prior Publication Data
US 2013/0161549 A1    Jun. 27, 2013

(30) Foreign Application Priority Data

Sep. 29, 2010   (CN) .......................... 2010 1 0297010
Sep. 29, 2010   (CN) ..................... 2010 2 0548503 U

(51) Int. Cl.
*F16K 31/00*    (2006.01)
*F16K 31/44*    (2006.01)
(Continued)

(52) U.S. Cl.
CPC ................. *F16K 31/44* (2013.01); *B05B 1/18* (2013.01); *B05B 1/185* (2013.01); *B05B 1/3026* (2013.01); *E03C 1/0409* (2013.01); *B05B 1/3013* (2013.01)

(58) Field of Classification Search
CPC ..... F16K 31/44; B05B 1/3026; B05B 1/185; B05B 1/18; B05B 1/3013; E03C 1/0409
USPC ........ 251/120, 121, 122, 230; 239/530, 569, 239/581.1, 581.2, 582.1, 583, 596; 137/625.3, 599.01, 601.15, 601.18
See application file for complete search history.

(56) References Cited

U.S. PATENT DOCUMENTS 4,545,533 A * 10/1985 Botnick .......................... 239/282
5,456,448 A * 10/1995 Chou ............................. 251/230
(Continued)

FOREIGN PATENT DOCUMENTS

CN    87206541 U    6/1988
CN    2373649 Y    4/2000
(Continued)

*Primary Examiner* — Craig Schneider
*Assistant Examiner* — Andrew J Rost
(74) *Attorney, Agent, or Firm* — Rabin & Berdo, P.C.

(57) ABSTRACT

A flow adjusting device includes a fixation unit with a waterway and a button; the fixation unit is disposed with a movable shaft, a pushing rod and a spring, the movable shaft and the pushing rod can move relatively to the fixation unit, the motion direction is parallel to the flowing direction of the water in the waterway, the discharge area of the waterway is changed by the relative motion of the movable shaft and the fixation unit to adjust the flow rate, thereinto, the fixation unit, the movable shaft, the pushing rod and the spring are cooperated to form an automatic ball-point pen like movable mechanism; the button is connected to the fixation unit in a sliding way, the sliding direction of the button is vertical to that of the movable shaft, the button and the end of the pushing rod are formed a linkage construction.

6 Claims, 6 Drawing Sheets

(51) Int. Cl.
  B05B 1/18  (2006.01)
  E03C 1/04  (2006.01)
  B05B 1/30  (2006.01)

(56) References Cited

U.S. PATENT DOCUMENTS

| | | | | |
|---|---|---|---|---|
| 5,704,397 | A * | 1/1998 | Lu | E03C 1/08 137/630.15 |
| 6,059,200 | A * | 5/2000 | Chou | 239/124 |
| 6,220,530 | B1 * | 4/2001 | Wu | 239/583 |
| 6,568,605 | B1 * | 5/2003 | Chen | 239/525 |
| 7,377,456 | B2 * | 5/2008 | Wang | 239/526 |
| 8,561,632 | B2 * | 10/2013 | Bayer | 137/219 |
| 2008/0067264 | A1 * | 3/2008 | Erickson et al. | 239/445 |

FOREIGN PATENT DOCUMENTS

| | | |
|---|---|---|
| CN | 201031985 Y | 3/2008 |
| CN | 201166142 Y | 12/2008 |
| CN | 201796298 U | 4/2011 |
| CN | 102095017 A | 6/2011 |
| JP | 2008-019951 A | 1/2008 |

* cited by examiner

FLOW ADJUSTING DEVICE WITH A BUTTON

FIELD OF THE INVENTION

The present invention relates to a shower device, especially to a flow adjusting device with a button.

BACKGROUND OF THE INVENTION

A patent for invention is disclosed in the Chinese patent database in the Nov. 17, 2008 with application number ZL200820016925.5 named a flow rate controller. The controller is disposed with a body disposed with a groove, an inlet disposed in the body and an outlet, a switch button a and a switch button b disposed inside the body, a restoring spring, a constant pressure sealing ring, a water diversion body with an outlet hole and outlet, a sealing ring and a switch button disposed in the switch button a; the switch button a is engaged to the switch button b, the restoring spring, the constant pressure sealing ring and the water diversion body are disposed below the switch button b, the sealing ring is disposed below the water diversion body; the flange at the upper end of the switch button b can be slide along the groove of the body, the flange can withstand the bottom of the rib beside the groove; similarly to a spring ball point pen control way, the flow rate is controlled by the on-off of the outlet controlled by the switch button a and the switch button b; it can be assembled in the handle of the shower or the outlet, the front end or back end of a shower tap, the flow rate can be switched rapidly by the switch button. However, it has disadvantages as below: 1. the sliding direction of the switch button is vertical to the water flowing direction, so that the controller increases the space occupied, especially in a shower; 2. the sliding direction of the switch button is vertical to the water flowing direction, so that it needs more pressure force.

SUMMARY OF THE INVENTION

The present invention is provided with a flow adjusting device with a button, which overcomes the problems of the water flow rate controller that it occupies more space and it needs more pressure force.

The technical proposal of the present invention to solve the above problem is as below:

A flow adjusting device with a button includes a fixation unit with a waterway and a button; the fixation unit is disposed with a movable shaft, a pushing rod and a spring, the movable shaft and the pushing rod can move relatively to the fixation unit, the motion direction is parallel to the flowing direction of the water in the waterway, the discharge area of the waterway is changed by the relative motion of the movable shaft and the fixation unit to adjust the flow rate, thereinto, the fixation unit, the movable shaft, the pushing rod and the spring are cooperated to form an automatic ball-point pen like movable mechanism; the button is connected to the fixation unit in a sliding way, the sliding direction of the button is vertical to that of the movable shaft, the button and the end of the pushing rod are formed a linkage construction.

The inner end of the button is disposed to be an inclined surface, the end of the pushing rod is disposed to be an inclined surface, the inclined surface of button is coupled and contacted to the inclined surface of the pushing rod.

An assembly cavity is disposed inside the fixation unit;

The waterway is divided to several water diversion cavities of surrounded the assembly cavity in an annular way and a central waterway connected to the water diversion cavities;

The movable shaft is assembled in the assembly cavity in a sliding way, and the movable shaft is disposed with a control end extended out of the assembly cavity in a sealing way and a coupling end; thereinto, the movable shaft is moved between a first position and a second position, the control end is separated from the central waterway when the movable shaft is in the first position, and the discharge area is the section area of the central waterway; the control end is plugged into the central waterway when the movable shaft is in the second position, the discharge area is the section area of the clearance between the control end and the central waterway.

A sliding cavity is disposed inside the fixation unit, a connection hole is disposed between the sliding cavity and the assembly cavity;

The button is connected to the sliding cavity inside in a sliding way;

The pushing rod is disposed with a head part and an end part, the head part is assembled inside the assembly cavity and withstood the coupling end of the movable shaft, the end part is passing through the connection hole to plug into the sliding cavity.

A first ratchet is disposed inside the assembly cavity of the fixation unit, a second ratchet is disposed in the coupling end of the movable shaft, a third ratchet is disposed in the head end of the pushing rod, the second ratchet is coupled to the first ratchet and the third ratchet.

The fixation unit includes:

A fixation shaft, the first end of the fixation shaft is concaved and disposed with an assembly groove, a limited body is disposed in the assembly groove to cover the assembly groove, the limited body and the fixation shaft are coupled to form the assembly cavity, the water diversion cavities are running through the fixation shaft along the axis of the fixation shaft;

An outlet, which is disposed with an outlet cavity and the central waterway, the central waterway is connected to the outlet cavity;

A terminal, which is sleeved in the limited body and connected to the first end of the fixation shaft and the outlet to make the water diversion cavities connected to the central waterway.

The fixation unit further includes a housing, which is sleeved to the fixation shaft outside and fixed to the outlet.

The end of the housing is disposed with an opening, the outlet is assembled inside the housing through the opening; the edge of the opening of the housing is disposed with a lock catch; the periphery of the terminal is disposed with a lock groove, the lock catch is locked to the lock groove.

Compared to the existing technology, the technical proposal of the present invention has advantages as below:
1. The sliding direction of the movable shaft and the pushing rod is parallel to the water flowing direction, the structure is clever, the axial size of the fixation unit is small, it occupies small space to release the user's press force, the switch is convenient;
2. The inclined surface of the button is coupled to and contacted to the inclined surface of the pushing rod to realize the linkage of the button and the pushing rod, the pressing is convenient;
3. The movable shaft is moved between a first position and a second position, the control end is separated from the central waterway when the movable shaft is situated in the first position, the discharge area is the section area of the central waterway, so that the water flow rate is large; the control end is plugged into the central waterway when the movable shaft is situated in the second position, the discharge area is the section area of the clearance of the control end and the central waterway, so that the water flow rate is small to be water saving;

4. The control end of the movable shaft is extended out of the assembly cavity in a sealing way, the switch is waterless and saving labor with long life;

5. The fixation unit includes a fixation shaft, an outlet and a terminal, the structure is clever and convenient for assembly and manufacture;

6. The housing is disposed with an opening, the outlet is assembled inside the housing through the opening, and it is convenient to assemble; the edge of the opening of the housing is disposed with a lock catch, the periphery of the terminal is disposed with a lock groove, the lock catch is locked to the lock groove for convenience to fix every component of the fixation unit.

BRIEF DESCRIPTION OF THE DRAWINGS

The present invention will be further described with the drawings and embodiments.

DETAILED DESCRIPTION OF THE EMBODIMENTS

Figure 1:
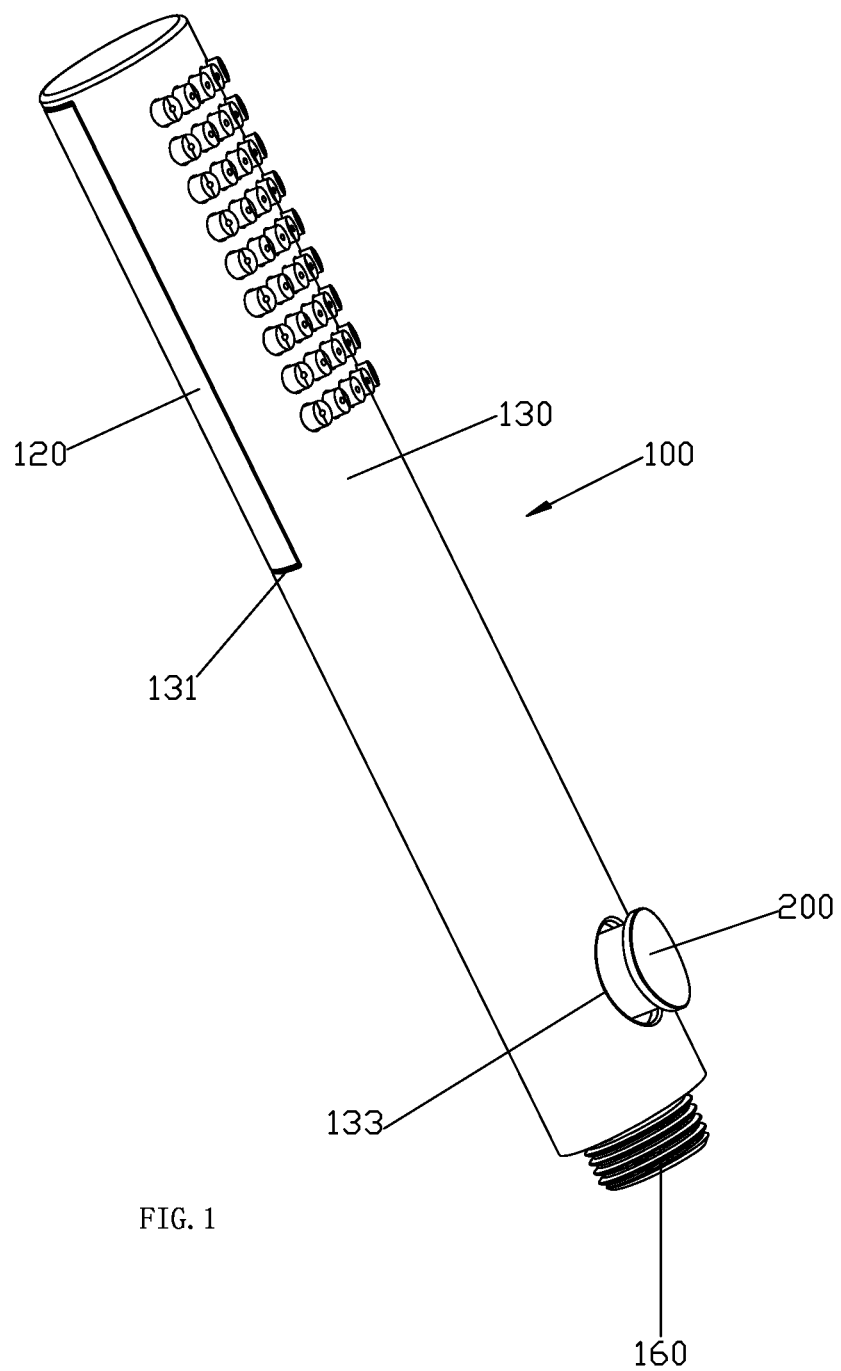
FIG. 1 illustrates the structure of the shower of the present invention.
Figure 2:
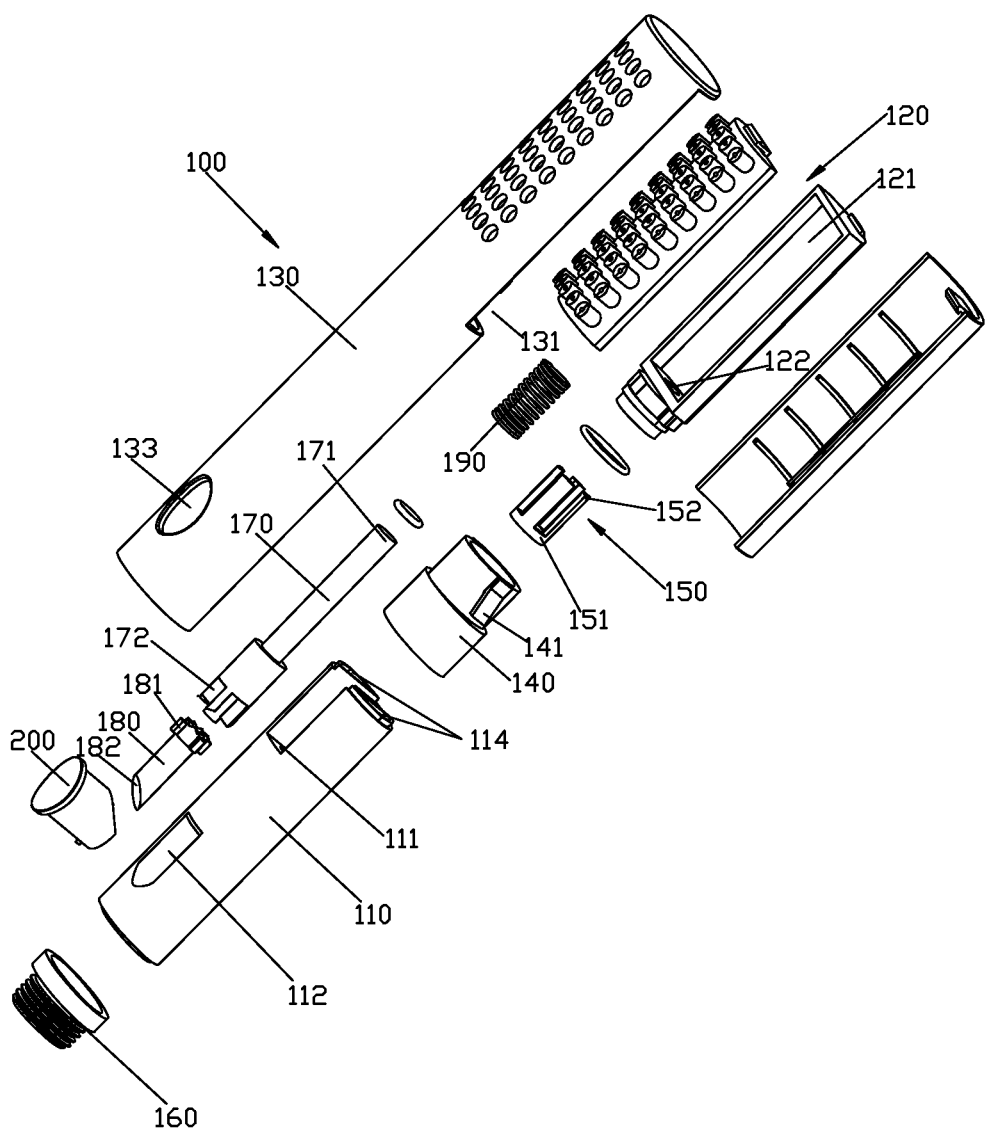
FIG. 2 illustrates the breakdown structure of the shower of the present invention in an angle of view.
Figure 3:
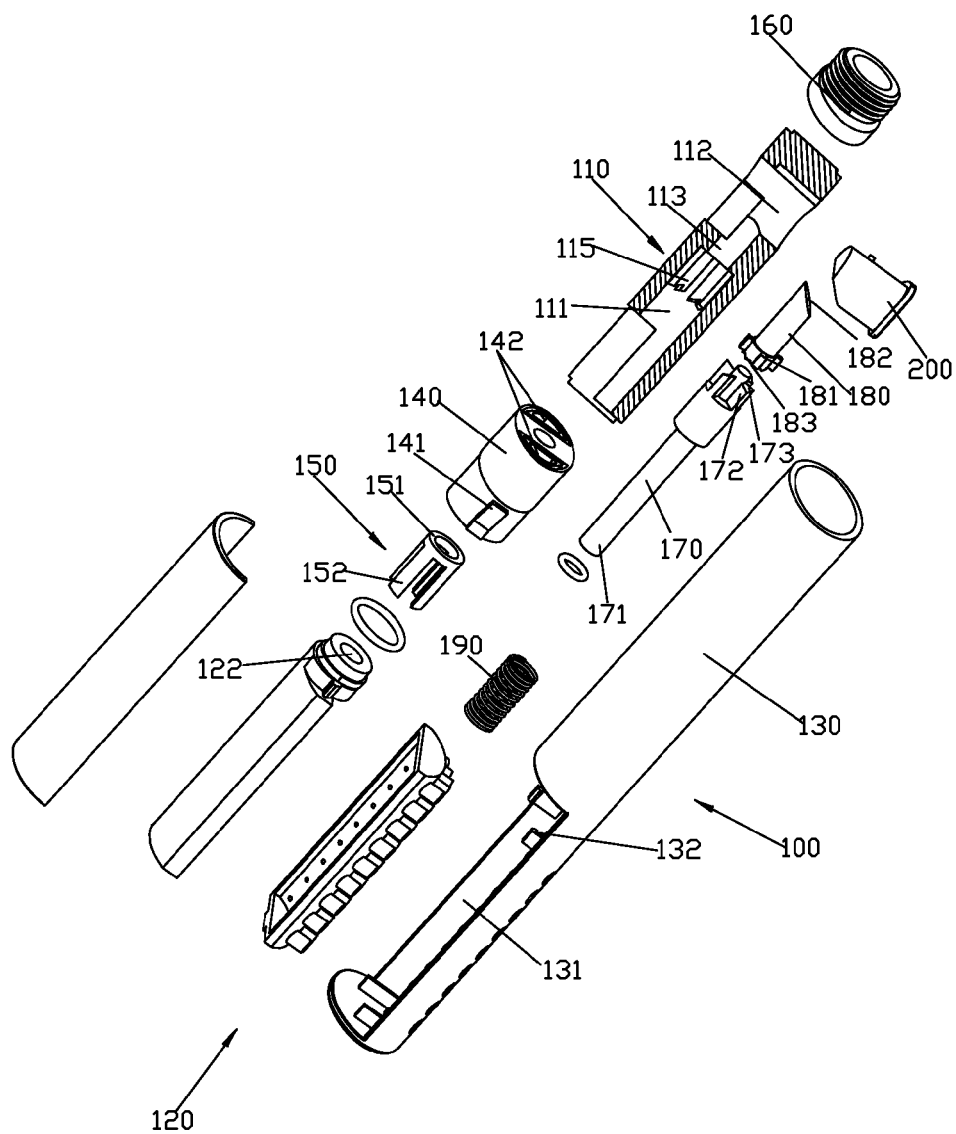
FIG. 3 illustrates the breakdown structure of the shower of the present invention in another angle of view.

Refer to the FIG. 1 to FIG. 7 of a flow adjusting device with a button, which is disposed with a fixation unit 100 and a button 200.

The fixation unit 100 includes a fixation shaft 110, an outlet 120, a housing 130, a terminal 140, a limited body 150 and a plug 160.

The fixation shaft 110 is assembled inside the housing 130, the external diameter of the fixation shaft 110 is coupled to the internal diameter of the housing 130; the plug 160 is fixed to the first end of the housing 130 inside and withstood the first end of the fixation shaft 110 to prevent the fixation shaft 110 separating from the housing 130; the fixation shaft 110 is connected to the water resource, such as a water pipe, through the plug 160.

The second end of the housing 130 is disposed with an opening 131, which is disposed with a lock catch 132. The housing 130 is further disposed with a throughout hole 133 throughout inside and outside. The terminal 140 is disposed with a stepped revolution body and a lock groove 141 fixed to the stepped revolution body outside, the end face of the stepped revolution body of the terminal 140 is disposed two grooves 142, the exterior end of the grooves 142 is disposed in the end face, while the interior end is disposed in the large revolution surface of the stepped revolution body. The limited body 150 is disposed with an annular body 151 and several position cylinders 152 of parallel to each other in the axial direction and fixed to the end face of the annular body 151. The outlet 120 is disposed with an outlet cavity 121 and a central waterway 122 connected to the outlet cavity 121.

The second end of the fixation shaft 110 is concaved and disposed with an assembly groove 111, the axis of which is coincided to the axis of the fixation shaft 110 and the axis of the housing 130; a sliding cavity 112 is disposed in the fixation shaft 110, the sliding cavity 112 is vertical to the axis of the assembly groove 111, and a connection hole 113 is disposed between the sliding cavity 112 and the assembly groove 111; two water diversion cavities 114 of symmetry and throughout in the axial direction are disposed in the fixation shaft 110, the water diversion cavities 114 are parallel to the axis of the assembly groove 111. The fixation shaft 110 is disposed inside the housing 130, the first end of the water diversion cavities 114 is connected to the plug 160 to connect to the water resource, the sliding cavity 112 is corresponding to the throughout hole 133.

The stepped revolution body of the terminal 140 is withstood the end part of the fixation shaft 110, the lock groove 141 is coupled and locked to the lock catch 132 to limit the relative motion of the terminal 140, the fixation shaft 110 and the housing 130 in the axial direction. the annular body 151 of the limited body 150 is covered the assembly groove 111 of the fixation shaft 110, the end of the position cylinders 152 is withstood the stepped surface of the steeped revolution body to be fixed in the axial direction, making the assembly groove 111 coupled to the annular body 151 of the limited body 150 to form the assembly cavity and making the axis of the interior hole (a circular through hole) of the annular body 151 of the limited body 150 coincided to the axis of the assembly groove 111. the exterior ends of the grooves 142 of the terminal 140 are separately connected to the water diversion cavities 114 to lead the water flowing into the large revolution hole of the terminal 140 and then into the small revolution hole of the stepped revolution body through the clearance of two adjacent position cylinders 152.

The outlet 120 is fixed to the housing 130 inside, making that: the end of the outlet 120 is fixed to the interior revolution surface of the terminal 140 in a sealing way, the central waterway 122 is connected to the small revolution hole of the terminal 140 to lead the water of the water diversion cavities to the outlet cavity; the axis of the central waterway 122 is coincided to that of the assembly groove 111.

In this embodiment, the waterway of the fixation unit 100 includes two water diversion cavities and the central waterway 122, that is to say, the water flowing direction is parallel to the axis, the water diversion cavities is connected to the central waterway through the groove and the interior revolution hole of the terminal.

The fixation unit 100 is disposed with a movable shaft 170, a pushing rod 180 and a spring 190 inside.

The movable shaft 170 is assembled in the assembled cavity in a sliding way, the sliding direction is coincided with the axis of the assembly groove 111, that is to say the water flowing direction is parallel to the axis, the movable shaft 170 is disposed with a control end 171 and a coupling end 172; the control end 171 of the movable shaft 170 is extended out of the annular body 151 of the limited body 150 in a sealing way. The discharge area of the waterway is changed by the relative motion of the control end 171 of the movable shaft 170 and the central waterway 122 of the fixation unit 100 to adjust the flow rate.

The spring 190 is sleeved in the movable shaft 170 and withstood between the coupling end 172 and the annular body 151 of the limited body 150.

The pushing rod 180 is assembled inside the assembly cavity in a sliding way, the sliding direction is coincided with the axis of the assembly groove 111, that is to say, the water flowing direction is parallel to the axis, and the pushing rod 180 is disposed with a head part 181 and an end part 182, the head part 181 is disposed inside the assembly groove 111 and withstood the coupling end 172 of the movable shaft 170, the end part 182 is running through the through hole 113 to plug into the sliding cavity 112 inside. Besides, the end face of the end part 182 is disposed to be an inclined surface.

A first ratchet is disposed inside the assembly groove 111, a second ratchet is disposed in the coupling end 172 of the movable shaft 170, a third ratchet is disposed in the head end of the pushing rod 180, the second ratchet is coupled to the first ratchet and the third ratchet to making the fixation unit, the movable shaft, the pushing rod and the spring cooperated to form an automatic ball point pen movable mechanism, the movable shaft 170 slides when the pushing rod 180 is pressed and slides.

The button 200 is connected to the throughout hole 133 and the sliding cavity 112 of the fixation unit 100 in a sliding way, the sliding direction of the button 200 is vertical to the sliding direction of the movable shaft 110, the interior end face of the button is disposed to be an inclined surface. The inclined surface of the button 200 is coupled and contacted to the inclined surface of the pushing rod 180 to form a linkage construction.

Figure 4:
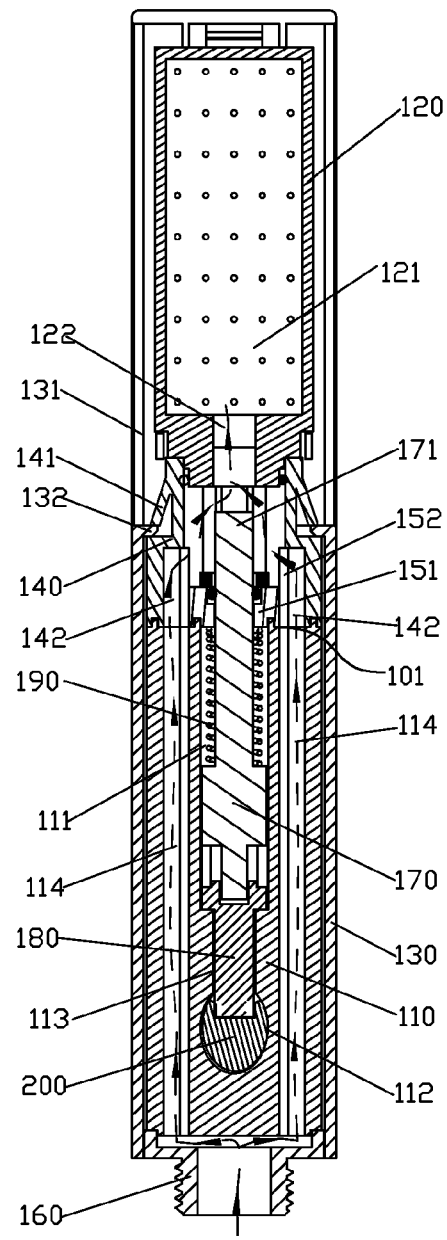
FIG. 4 illustrates the first sectional view of the shower of the present invention when the shower is situated in large discharge state.
Figure 5:
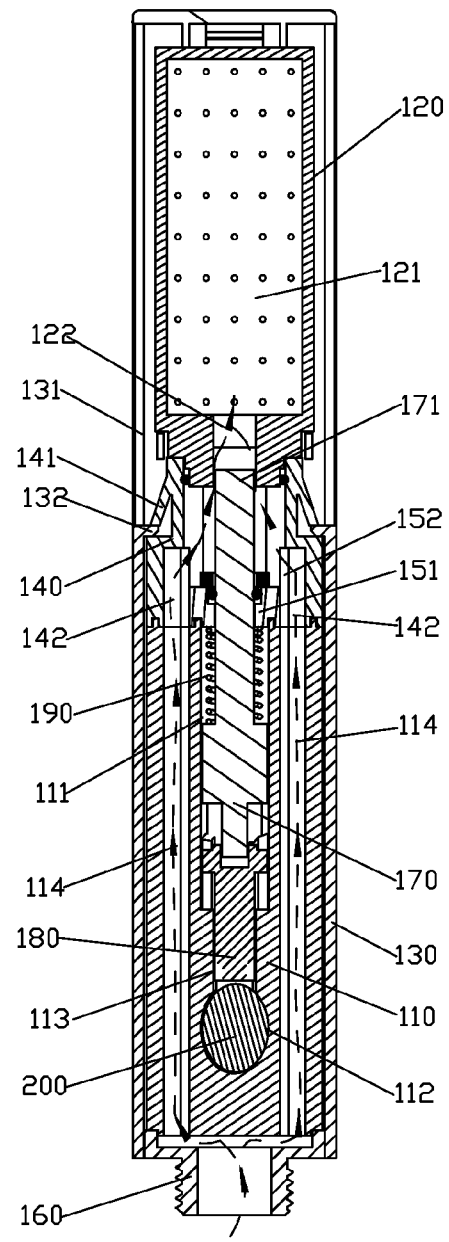
FIG. 5 illustrates the sectional view of the shower of the present invention when the shower is situated in water-saving state.
Figure 6:
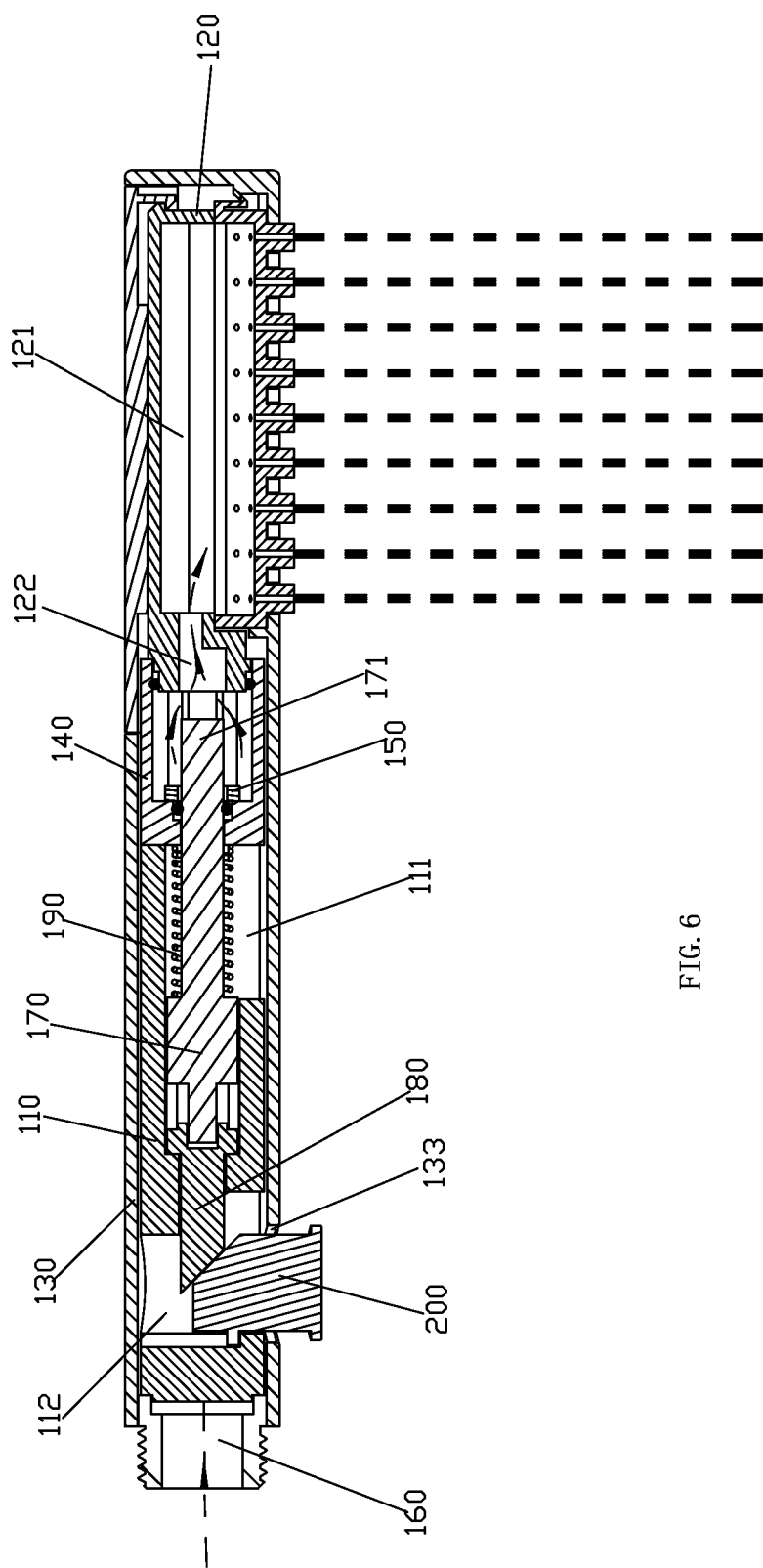
FIG. 6 illustrates the second sectional view of the shower of the present invention when the shower is situated in large discharge state.
Figure 7:
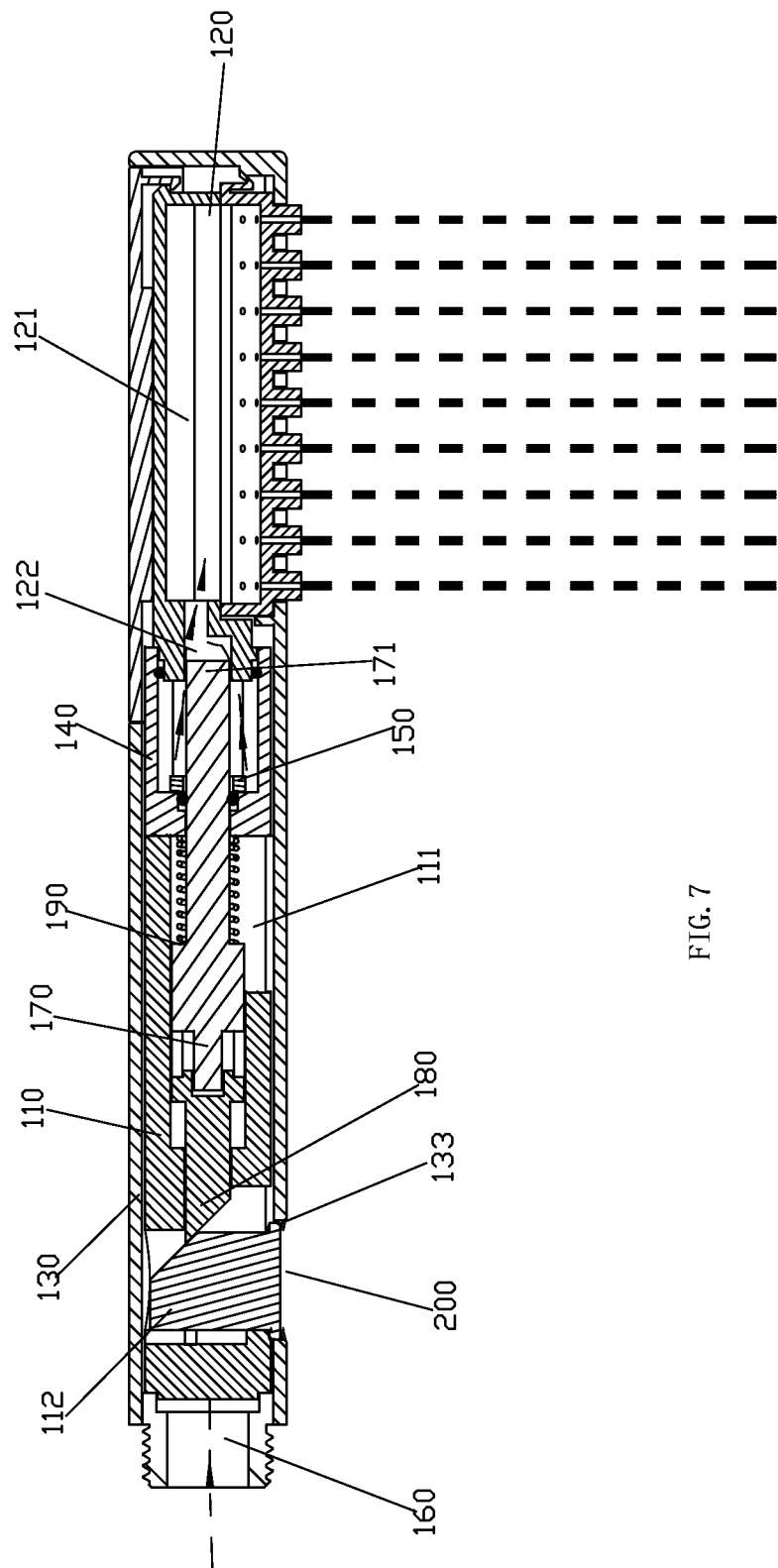
FIG. 7 illustrates the second sectional view of the shower of the present invention when the shower is situated in water-saving state.

The pushing rod 180 slides to drive the movable shaft 170 to slide when the button 200 is pressed, making the movable shaft 170 moved between a first position and a second position, please refer to the FIG. 4 and FIG. 6, the control end 171 is separated from the central waterway 122 when the movable shaft 170 is situated in the first position, the discharge area is the section area of the central waterway; refer to the FIG. 5 and FIG. 7, the control end 171 is plugged into the central waterway 122 when the movable shaft 170 is situated in the second position, the discharge area is the section area of the clearance between the control end 171 and the central waterway 122.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a flow adjusting device with a button, in which the sliding direction of the movable shaft and the pushing rod is parallel to the water flowing direction, the structure is clever, the axial size of the fixation unit is small, and it occupies small space to release the press force of the user, the switch is convenient.

What is claimed is:

1. A flow adjusting device with a button, comprising:
a fixation unit with a waterway and the button;
the fixation unit is provided with a movable shaft, a pushing rod and a spring,
the movable shaft and the pushing rod can move relatively to the fixation unit,
a motion direction is parallel to the flowing direction of the water in the waterway,
a discharge area of the waterway is changed by the relative motion of the movable shaft and the fixation unit to adjust the flow rate,
the fixation unit, the movable shaft, the pushing rod and the spring cooperate to form a movable mechanism similar to that of an automatic ball-point pen;
the button is connected to the fixation unit in a sliding way,
the sliding direction of the button is vertical to that of the movable shaft,
the button and the end of the pushing rod are formed a linkage construction,
wherein:
an assembly cavity is disposed inside the fixation unit, provided with a seal to seal it from the waterway;
the waterway is divided into several water diversion cavities that annularly surround the assembly cavity and a central waterway connected to the water diversion cavities;
the movable mechanism is located in the assembly cavity;
the movable shaft is configured to slide in the assembly cavity in response to the movable mechanism; and
the movable shaft is provided with a control end extending out of the assembly cavity through the seal, and a coupling end;
the movable shaft is moved between a first position and a second position,
the control end is withdrawn from the central waterway when the movable shaft is in the first position,
the discharge area is the section area of the central waterway;
the control end is plugged into the central waterway when the movable shaft is in the second position,
the discharge area is the section area of the clearance between the control end and the central waterway, and
the fixation unit includes:
a fixation shaft,
the first end of the fixation shaft is concaved and disposed with an assembly groove,
a limited body is disposed in the assembly groove to cover the assembly groove,
the limited body and the fixation shaft are coupled to form the assembly cavity,
the water diversion cavities are running through the fixation shaft along the axis of the fixation shaft;
an outlet, which is disposed with an outlet cavity and the central waterway,
the central waterway is connected to the outlet cavity;
a terminal, which is sleeved in the limited body and connected to the first end of the fixation shaft and the outlet to make the water diversion cavities connected to the central waterway.

2. A flow adjusting device with a button according to the claim 1, wherein
the inner end of the button is disposed to be an inclined surface,
the end of the pushing rod is disposed to be an inclined surface,
the inclined surface of button is coupled and contacted to the inclined surface of the pushing rod.

3. A flow adjusting device with a button according to the claim 1, wherein
a sliding cavity is disposed inside the fixation unit, a connection hole is disposed between the sliding cavity and the assembly cavity;

the button is connected to the sliding cavity inside in a sliding way;

the pushing rod is disposed with a head part and an end part, the head part is assembled inside the assembly cavity and withstood the coupling end of the movable shaft, the end part is passing through the connection hole to plug into the sliding cavity.

4. A flow adjusting device with a button according to the claim 3, wherein a first ratchet is disposed inside the assembly cavity of the fixation unit, a second ratchet is disposed in the coupling end of the movable shaft, a third ratchet is disposed in the head end of the pushing rod, the second ratchet is coupled to the first ratchet and the third ratchet.

5. A flow adjusting device with a button according to the claim 1, wherein the fixation unit further includes a housing, which is sleeved to the fixation shaft outside and fixed to the outlet.

6. A flow adjusting device with a button according to claim 5, wherein the end of the housing is disposed with an opening, the outlet is assembled inside the housing through the opening; the edge of the opening of the housing is disposed with a lock catch;

the periphery of the terminal is disposed with a lock groove, the lock catch is locked to the lock groove.

* * * * *